United States Patent
Chen et al.

(10) Patent No.: US 8,654,250 B2
(45) Date of Patent: Feb. 18, 2014

(54) DERIVING VISUAL RHYTHM FROM VIDEO SIGNALS

(75) Inventors: Ching-Wei Chen, Oakland, CA (US); Trista Chen, Emeryville, CA (US)

(73) Assignee: Sony Corporation, Tokyo (JP)

( * ) Notice: Subject to any disclaimer, the term of this patent is extended or adjusted under 35 U.S.C. 154(b) by 58 days.

(21) Appl. No.: 13/074,393

(22) Filed: Mar. 29, 2011

(65) Prior Publication Data

US 2012/0033132 A1    Feb. 9, 2012

Related U.S. Application Data

(60) Provisional application No. 61/319,091, filed on Mar. 30, 2010.

(51) Int. Cl.
*H04N 21/2368* (2011.01)

(52) U.S. Cl.
USPC .......................................... 348/462; 348/515

(58) Field of Classification Search
USPC ............................................................. 348/462
See application file for complete search history.

(56) References Cited

U.S. PATENT DOCUMENTS

| | | | | |
|---|---|---|---|---|
| 6,996,181 | B2 * | 2/2006 | Seok | 375/240.16 |
| 2007/0140526 | A1 * | 6/2007 | Pirim | 382/103 |
| 2009/0154832 | A1 * | 6/2009 | Pham | 382/280 |
| 2010/0026722 | A1 * | 2/2010 | Kondo | 345/660 |

* cited by examiner

*Primary Examiner* — Jefferey Harold
*Assistant Examiner* — Justin Sanders
(74) *Attorney, Agent, or Firm* — Finnegan, Henderson, Farabow, Garrett & Dunner, L.L.P.

(57) ABSTRACT

A method and a system for deriving visual rhythm from a video signal are described. A feature extraction module receives the video signal and extracts a two-dimensional feature from the video signal. A one-dimensional video feature computation module derives a one-dimensional feature from the extracted two-dimensional feature. A visual rhythm detector module detects a visual beat and a visual tempo from the one-dimensional feature.

23 Claims, 11 Drawing Sheets

US 8,654,250 B2

DERIVING VISUAL RHYTHM FROM VIDEO SIGNALS

CROSS-REFERENCE TO RELATED APPLICATION

This application claims priority from U.S. Provisional Patent Application Ser. No. 61/319,091 filed Mar. 30, 2010.

TECHNICAL FIELD

This application relates to a method and system for video processing.

BACKGROUND

Beats, traditionally used in the context of music, represent distinctive rhythmic events such as the beat of a drum or the start of a new melodic note. The word "beats" represents perceptually significant audio events that together form the temporal structure and pattern of the musical piece or "rhythm". Musical beats are usually characterized by a pulse, or rapid increase in energy in the audio signal, in either the time or frequency domains. These events usually correspond to a distinctive musical event, such as the beat of a drum, or the onset of a new note in a melody.

BRIEF DESCRIPTION OF THE DRAWINGS

The present invention is illustrated by way of example, and not by way of limitation, in the figures of the accompanying drawings in which.

DETAILED DESCRIPTION

Figure 1:
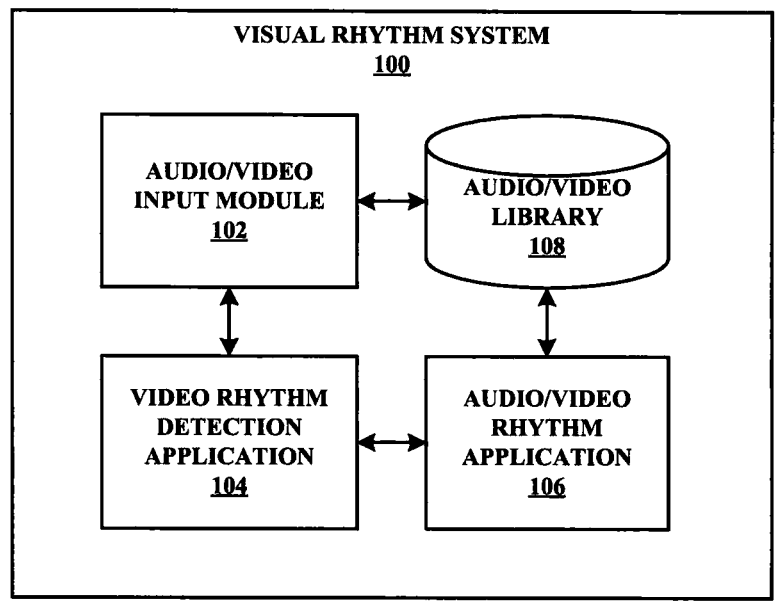
FIG. 1 is a block diagram illustrating an example embodiment of a system for deriving visual rhythms from a video signal.

Although the present invention has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense.

In various embodiments, a method and a system for deriving visual rhythm from a video signal are described. A video feature extraction module receives the video signal and extracts a two-dimensional feature from the video signal. A one-dimensional video feature computation module derives a one-dimensional feature from the extracted two-dimensional feature. A visual rhythm detector module detects a visual beat and a visual tempo from the one-dimensional feature.

In an embodiment, a first signal having a first tempo is received. A second signal having a second tempo is received. The first signal is synchronized to the second tempo using techniques described herein. One or both of the signals may comprise audio signals or at least two frames of a video signal. The tempos may comprise audio or visual beat positions. The signals may be synchronized by aligning the beat positions in one or either signal.

In an example embodiment, a visual beat is provided to indicate distinctive visual events such as a rhythmic gesture or sudden camera motion. Visual rhythm may refer to the more general concept of groups and patterns of multiple visual beats.

These detected visual beats may be further processed for use in various multimedia applications, such as selecting and synchronizing audio and video content, as well as in gaming applications. Accordingly, in example embodiments the methods described herein may be deployed in media players, Set-Top-Boxes, gaming consoles and other consumer electronic devices.

In the context of music, the word "beats" represents perceptually significant audio events that together form the temporal structure and pattern of the musical piece or "rhythm". Musical beats are usually characterized by a pulse, or rapid increase in energy in the audio signal, in either the time or frequency domains. These events usually correspond to a distinctive musical event, such as the beat of a drum, or the onset of a new note in a melody.

In the visual domain, in an example embodiment, visual beats may be similarly be perceived as significant events created by rhythmic motion of objects. An example of rhythmic motion and associated visual beats is illustrated by the motions and gestures of a dancer. These dance motions may include extending the arm, tilting the head, or bending the knees, which are often performed synchronously with the rhythm in a piece of music. As we watch a dance performance, we can perceive these beats or rhythmic events both from the music, as well as from the movements of the dancer.

In another example, an observer may detect the rhythm of a piece of music playing in someone else's headphones simply by watching the movement of the listener's head as it nods up and down with the music. From this example, we see that it is possible to perceive a clear rhythmic pattern from a visual stimulus alone, without listening to the accompanying music at all. Example embodiments described herein include the concept of "visual beats". Similar to beats in music, visual beats are defined here as distinctive visual rhythmic events, that can form the temporal structure and pattern of a video signal, or visual rhythm.

A concept related to "visual tempo" has been used to detect story boundaries in a long video clip such as a home video or a movie video. This visual tempo, set at 80% of a group of pictures' highest histogram peak, represents long-term characteristics over the entire video sequence, and uses a coarse time granularity. In contrast, the proposed concept of visual beats described in this application is intended to describe the fine-grained temporal locations of perceived rhythmic events produced by gestures or motion within a much shorter video sequence.

In addition to responsive to human motion, visual beats may be perceived as a result of other significant visual events, which may include camera panning, scene transitions, or lighting changes. A successful visual beat detection approach should be able to handle these as well.

FIG. 1 is a block diagram illustrating an example embodiment of a visual rhythm system 100 for deriving visual rhythms from a video signal. The visual rhythm system 100 has for example an audio/video input module 102, a video rhythm and beat detection application 104, an audio/video rhythm application 106, and an audio/video library 108. The audio/video input module 102 is configured to receive an audio signal and/or video signal from a source. For example, the video signal may be from a stream from a video camera, a video player, a computer, or any other video generating devices.

In an example, visual beat and rhythm detection are perceived with the video rhythm detection application 104 when there is a periodic or semi-periodic repetition of relatively significant and rapid changes in visual content from the video signal received from audio/video input module 102. These changes may be a result of many different occurrences, including lighting changes, scene transitions, camera motion, or motion of people or objects within the visual image. In one embodiment, the video rhythm detection application 104 receives only the video feed portion of audio/video input module 102.

One example of visual beats is that resulting from rhythmic human motion such as dance. Rhythmic movements and gestures are usually characterized by coordinated movement of one or more objects in a limited number of directions. In this situation, visual beats are usually perceived at times when this motion changes abruptly, such as when motion starts, stops, or changes direction. For example, when waving a hand from side to side, visual beats may be perceived when the hand stops at one side before switching directions. This observation also holds for certain dance videos where multiple dancers are moving in a synchronized manner, or in general when objects in the video frame move in a synchronized manner.

The video rhythm detection application 104 detects where these significant changes occur in the video signal. In an example embodiment, first frame-level video features are extracted from each video frame. The raw feature frames are then analyzed to derive a one-dimensional novelty function.

By analyzing how this novelty function changes over time, visual beat times may be detected, or the visual rhythm and tempo of the video signal may be determined. The components and operation of the video rhythm detection application 104 are discussed in more detail below with respect to FIG. 2.

The audio/video rhythm application 106 utilizes the detected visual rhythm as determined by the video rhythm detection application 104 to provide subsequent processing techniques and applications. It should however be noted that these are merely example applications and that the example methods and systems/devices described herein are not limited to these example applications.

Motion-Controlled Audio Playback

Using the example embodiments described herein, a system is provided including a webcam video capture device, a personal computer to perform visual rhythm detection, and an audio playback device. In an example embodiment, all of these components may form part of a single notebook computer. In use, a user selects a piece of music stored in the audio/video library 108 that he/she wants to listen to. In order for the music to be played back, the user performs motions in front of the video capture device to produce visual beats and visual rhythm. The playback speed of the music is adjusted based on the visual rhythm detected by the visual rhythm detection application 104. Therefore, in an example embodiment, in order to hear the music at the original speed, the user must produce visual beats at the same rate as the audio tempo in the piece of music. This could provide motivation for a user to exercise. Or by slowing down and speeding up their movements, the user may enjoy the amusement of controlling, in real time, the playback speed of the selected piece of music.

Some users may also see this system as a performance device similar to how a conductor controls an orchestra by captures rhythmic motion in a non-gesture-specific way, using low-cost and ubiquitous hardware.

New Music Video Creation

In this example application, audio and visual beats are matched to a new video track to create a new music video. Given a music video stored in the audio/video library 108, example embodiments substitute the video track of a music video with a different one to create a new music video, by matching the audio beats of the given music video with the visual beats of the new video track. For example, given the music video of Beyonce's Single Ladies, example embodiments can keep the audio track while replacing the video track with Michael Jackson's Bad dance video. Since Michael Jackson's dance video has different visual beats as Beyonce's Single Ladies' audio beats, the video track is speed-adjusted to match the audio beats.

Music Substitution in Workout Videos

One example application of this processing is a system for music substitution in exercise/workout videos. Many people complain that watching the same workout video every day can become boring and reduce their motivation to exercise. A rhythm matching system first analyzes the desired workout video using the algorithm described above to detect the position of visual beats, as well as the visual tempo rate. The user may direct the system to a collection of audio files stored in the audio/video library 108, and the system then uses conventional audio beat detection and tempo estimation techniques to extract the rhythmic characteristics of each of the audio files in this collection. The system then finds candidate audio files that have the same audio tempo in BPM (beats per minute) as the selected workout video. These audio files may be substituted for the original soundtrack to provide a fresh "new" workout video every day. To make sure the new piece of music and the video content (instructor's move) blend naturally, example embodiments align the audio beats of the new piece of music with the visual beats.

Camera-Based Dancing Game in Game Consoles

In the real-world, a dance student might learn how to dance by mimicking an instructor's moves, while the instructor gives feedback on how well the student follows his/her moves. In a game setting, such as the popular arcade game Dance Dance Revolution® (DDR), a specialized floor pad and visual arrow indicators are used to see how well the gamer matches the designated moves of the dance. While the method of interacting with a live instructor is probably more natural, the game setting may be more entertaining. Now, example embodiments can use the visual rhythm detection technique for gamers and game interaction that is both natural and fun.

Without supplying any music or annotated arrows as DDR does, a dance video is simply displayed on the screen. A gamer may follow the dancer in the dance video with his/her moves, which are captured by a camera mounted on the game console. Visual beats of the captured video are detected in real time, and are matched up against the visual beats from the dance video. The better the two visual beats match, the higher the gamer scores.

It should be noted that the modules in FIG. 1 may be implemented in hardware, firmware, or any combination thereof.

Figure 2:
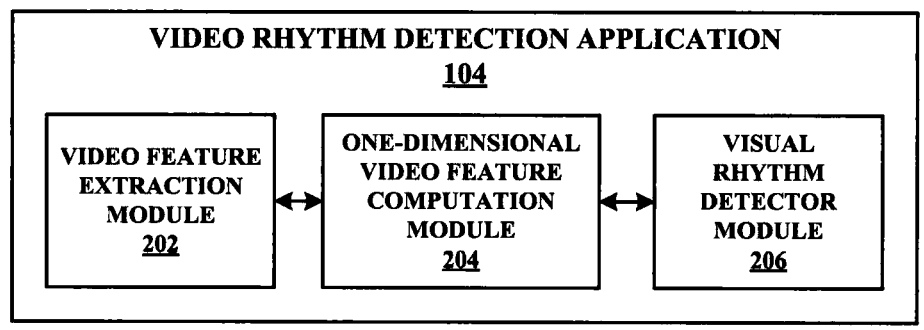
FIG. 2 is a block diagram illustrating an example embodiment of a video rhythm detection application.

FIG. 2 is a block diagram illustrating an example embodiment of the video rhythm detection application 104. In an example embodiment, at any given instant of time, a video signal is represented by a two-dimensional signal (representing the position of a pixel on a plane), as opposed to an audio waveform, which is a one-dimensional signal. In an example embodiment, the video rhythm detection application 104 includes a video feature extraction module 202, a one-dimensional video feature computation module 204, and a visual rhythm detector module 206. The two-dimensional video signal received from the audio/video input module 102 is analyzed to derive a one-dimensional video feature to determine visual rhythm.

In an example embodiment, the video feature extraction module 202 provides the first step of visual beat detection in finding relevant information to the task of visual beats. Visual beats can be derived from human motions, camera motions as panning, and lighting changes. An example embodiment of the video feature extraction module 202 uses the following techniques to find relevant information: optical flows and foreground masks. Both of them are two-dimensional features. Both techniques are further described below with respect to FIG. 3. Extracted video features from either technique are not directly usable by visual beat detection algorithm of the visual rhythm detector module 206 due to the different dimensionalities (two-dimension versus one-dimension). As such, the one-dimensional video feature computation module 204 describes example techniques to convert either the two-dimensional optical flow or foreground mask features to the one-dimensional video feature. Example embodiments of the one-dimensional video feature computation module 204 are described in more detail below with respect to FIG. 4. In one embodiment, the visual rhythm detector module 206 includes a beat detection algorithm from the audio domain that can then be applied to the one-dimensional novelty feature to find visual beats. Example embodiments of the visual rhythm detector module 206 are described in more detail below with respect to FIG. 5.

Figure 3:
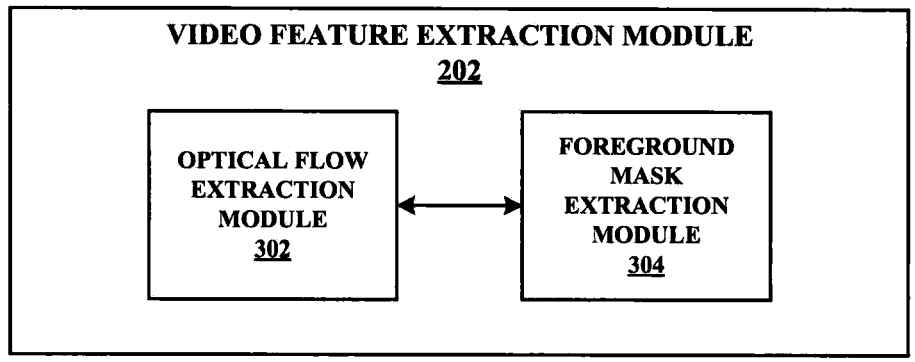
FIG. 3 is a block diagram illustrating an example embodiment of a video feature extraction module.

FIG. 3 is a block diagram illustrating an example embodiment of the video feature extraction module 202. The video feature extractor module 202 includes an optical flow extraction module 302 and a foreground mask extraction module 304.

For the optical flow extraction module 302, optical flow is the pattern of apparent motion of objects, surfaces, and edges in a visual scene caused by the relative motion between an observer (an eye or a camera) and the scene. Given two consecutive video frames of an object in motion, optical flow analysis may detect pixels that have changed position between the two frames. The optical flow feature consists of the two-dimensional coordinates of the moving pixel in each of the successive frames. From these coordinates, the optical flow extraction module 302 computes an optical flow vector that includes the angle and the magnitude of the detected motion. In one embodiment, the optical low extraction module uses the Pyramidal implementation of the Lucas Kanade optical flow estimation algorithm. It should however be noted that this disclosure is not limited to the use of this algorithm and other optical flow algorithms may be implemented in the optical flow extraction module 302.

Since optical flow describes the relative motion between the observer and the scene, it can capture both the human motion and camera motion. For example, if the camera (observer) is fixed, optical flows describe the human motion. If the camera is moving, optical flows describe the camera panning or zooming.

Having estimated a set of optical flow vectors for a two-frame sequence, the optical flow extraction module 302 then derives statistics to describe the distribution of the overall motion between the frames. Ignoring the absolute locations of the moving pixels, the optical flow extraction module 302 creates a two-dimensional histogram of the optical flow vectors, where the horizontal and vertical axes correspond to the magnitude and angle of the vector, respectively. The intensity in each bin in the histogram is computed by counting the number of optical flow vectors with that angle and magnitude. The example histograms have angles ranging from −pi to pi (top to bottom), and magnitude range from 3 to 10 pixels (left to right).

Figure 6A:
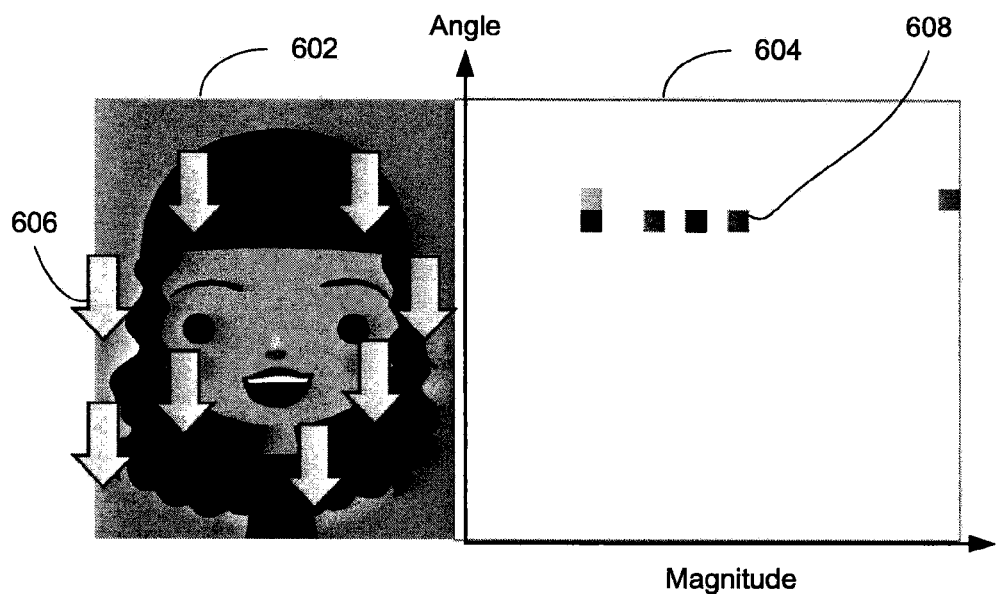
FIG. 6A is a block diagram illustrating an example of a video frame with a corresponding optical flow and a two-dimensional histogram.

FIG. 6A illustrates an example video frame 602 where the character is nodding down. Arrows 606 represent corresponding optical flows. A corresponding two-dimensional histogram 604 of the optical flows illustrates the angle and the magnitude of moving pixels 608. The horizontal axis corresponds to the magnitude of the motion. The vertical axis corresponds to the angle of the direction of the motion.

Figure 6B:
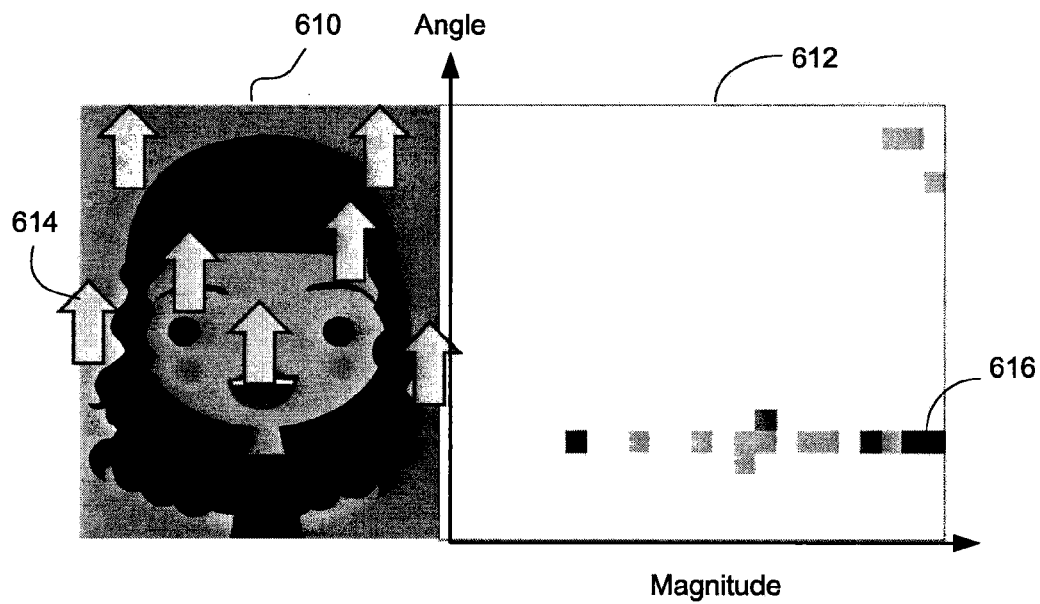
FIG. 6B is a block diagram illustrating another example of a video frame with a corresponding optical flow and a two-dimensional histogram.

FIG. 6B illustrates an example video frame 610 where the character is nodding up. Arrows 614 represent corresponding optical flows. A corresponding two-dimensional histogram 612 of the optical flows illustrates the angle and the magnitude of moving pixels 616. The horizontal axis corresponds to the magnitude of the motion. The vertical axis corresponds to the angle of the direction of the motion.

For the foreground mask extraction module 304, typical video scenes include a mixture of objects and regions that may be moving at different speeds, or not moving at all. In addition, some parts of the same object may be in motion while another is not, such as the limb of a human moving while the rest of the body is stationary or moving much slower than the limb. Since visual beats are related to the distinctive motion of objects or parts of objects in a scene, the foreground mask extraction module 304 isolates the moving parts from non-moving or slowly-moving parts in a scene.

Considering the non-moving or slowly moving objects in a scene to be the background, and the faster moving objects to be the foreground, the foreground mask extraction module 304 applies foreground detection techniques to identify regions of motion in the scene. In this example implementation, a foreground detection algorithm that is designed to segment fast moving foreground regions from slow or non-moving background regions may be applied. In this pixel-based algorithm, a feature vector representing a background model of each pixel is maintained and updated over time. A pixel may be considered a foreground pixel when it cannot be described by the background model of that pixel.

Figure 7A:
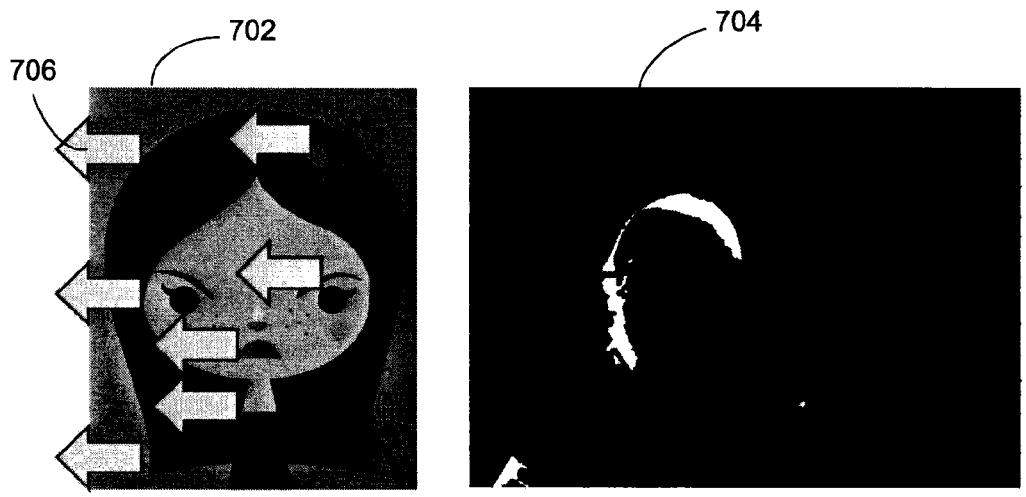
FIG. 7A is a block diagram illustrating an example of a video frame with a corresponding foreground mask.

FIG. 7A illustrates an example video frame 702 with a shaking head to the left represented with arrows 706 and its corresponding foreground 704.

Figure 7B:
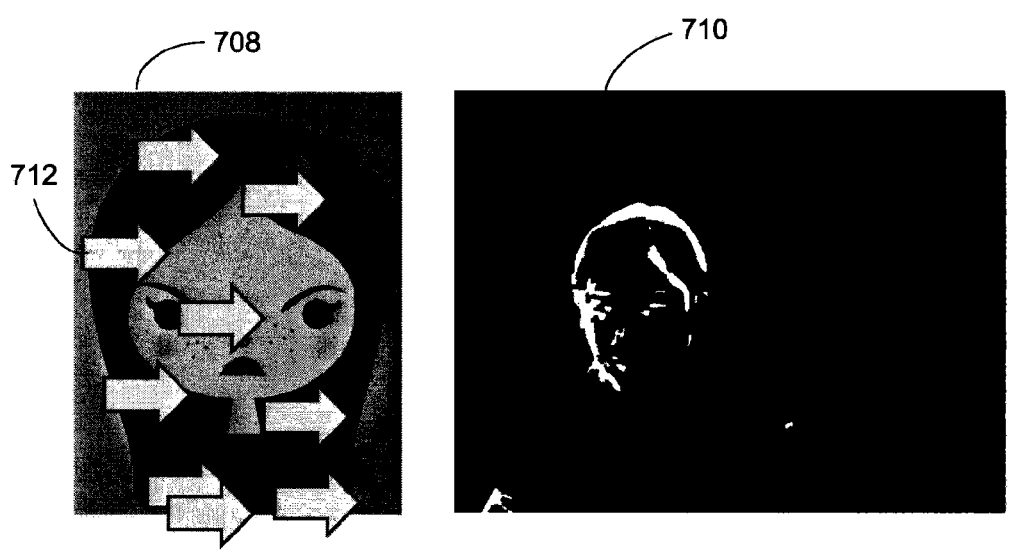
FIG. 7B is a block diagram illustrating another example of a video frame with a corresponding foreground mask.

FIG. 7B illustrates an example video frame 708 with a shaking head to the right represented with arrows 712 and its corresponding foreground 710.

By applying foreground detection methods to a video sequence, the foreground mask extraction module 304 may identify pixels that are moving with relatively higher velocities than their surrounding pixels. These fast moving pixels may correspond to regions of rhythmic motion, such as the movement of a nodding head or dancer's limb.

The above techniques produce a two-dimensional video feature histogram. To detect visual rhythm, a one-dimensional video feature computation module 204 reduces the two-dimensional histogram to a one-dimensional video feature that can be used with more traditional beat detection approaches from the music information retrieval domain. Likewise, foreground mask needs to be converted to one-dimensional feature to be used by the traditional beat detection algorithm.

Figure 4:
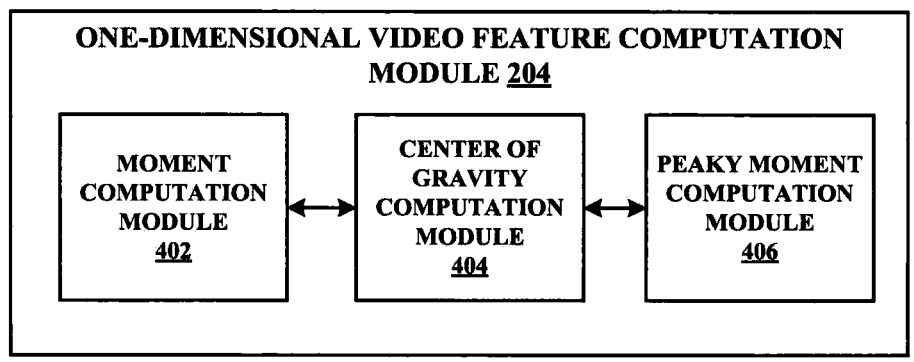
FIG. 4 is a block diagram illustrating an example embodiment of a one-dimensional video feature computation module.

FIG. 4 illustrates several example algorithms of the one-dimensional video feature computation module 204. The one-dimensional video feature computation module 204 may include the following computation modules with their corresponding algorithm: a moment computation module 402, a center of gravity computation module 404, and a peaky moment computation module 406.

The moment computation module 402 includes a corresponding algorithm that, given a two-dimensional video feature, computes the first order moment as:

$$M = \sum_x \sum_y (x - x_0)(y - y_o) I(x, y)$$

where M represents the first order moment. When applied to the two-dimensional histogram of the foreground mask, x and y correspond to pixel coordinates in the horizontal and vertical axes, respectively. When applied to the two-dimensional histogram of optical flow vectors, x and y correspond to the coordinates in angle and magnitude, respectively.

The center of gravity computation module 404 includes a corresponding algorithm that computes the center of gravity as:

$$G = \sum_x \sum_y sqrt((x - x_o)^2 + (y - y_o)^2) * I(x, y)$$

where G represents the center of gravity. Similarly, When applied to the two-dimensional histogram of the foreground mask, x and y correspond to pixel coordinates in the horizontal and vertical axes, respectively. When applied to the two-dimensional histogram of optical flow vectors, x and y correspond to the coordinates in angle and magnitude, respectively.

In general, the moment computation module 402 and the center of gravity computation module 404 derive the one-dimensional video feature from the summation of the pixel value times its kernel denoted as f(x, y).

$$T = \sum_x \sum_y f(x, y) * I(x, y)$$

The peaky moment computation module 406 includes a corresponding algorithm that, given a two-dimensional video feature, computes a one-dimensional video feature based on "angular peakiness" in order to measure the degree to which the motion in the two-dimensional histogram is intentional and coordinated. The angular peakiness of the optical flow histogram represents the degree to which the aggregated motion in the frame is coordinated—if most motion vectors are flowing in the same one or two directions, the peakiness will be high, whereas if most motion vectors are flowing in many different directions, the peakiness will be low. Peakiness is conceptually similar to kurtosis, except that peakiness is not measured in relation to a normal distribution. Peakiness is also known as inverse flatness, where flatness is a measure commonly used in audio signal processing, defined as the geometric mean of a vector divided by its arithmetic mean. If intensity$_{a,m}$ is the intensity of the motion histogram at angle a and magnitude m, then the angular peakiness at magnitude m is given by $$peakiness_m = -\left(1 - \frac{\sqrt[A]{\prod_{a=1}^{A} intensity_{a,m}}}{\frac{\sum_{a=1}^{A} intensity_{a,m}}{A}}\right)$$

The peaky moment computation module 406 then compute $d_t$, the value of our detection function at time t, by scaling the peakiness of each magnitude by the value of the magnitude, and summing over all magnitudes.

$$d_t = \sum_{m=1}^{M} m \times peakiness_m$$

By scaling the angular peakiness by the magnitude before summing, larger and faster synchronized movements are emphasized over smaller synchronized movements. This detection function is described as a "peaky moment".

Once the one-dimensional video feature computation module 204 determines the one-dimensional video feature function using one of the computation modules previously described, the visual rhythm detector module 206 analyzes the one-dimensional video feature to derive the visual rhythm. In an example embodiment, the visual rhythm may consist of two components: the first is visual beats, which refer to the exact temporal locations of visually perceptible rhythmic events. The second is visual tempo, which refers to a measure of the rate of repetition of visual beats.

Figure 5:
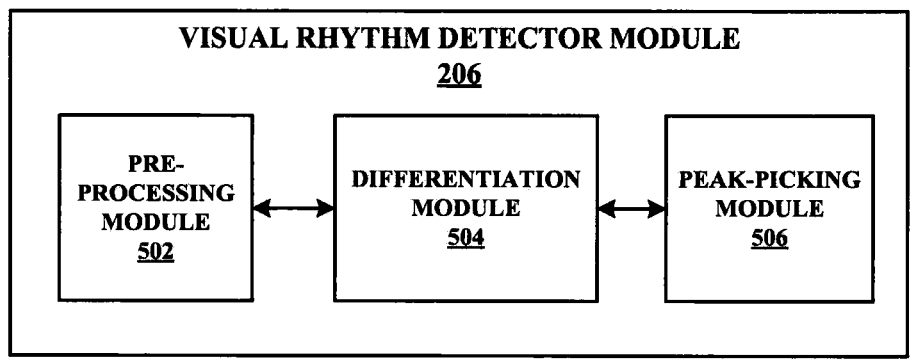
FIG. 5 is a block diagram illustrating an example embodiment of a visual rhythm detector module.

FIG. 5 is a block diagram illustrating an example embodiment of the visual rhythm detector module 206. In this stage, the visual rhythm detector module 206 applies a detection algorithm to find periods of perceptually significant energy fluctuation, corresponding with visual beats. In one embodiment, the visual rhythm detector module 206 includes a pre-processing module 502, a differentiation module 504, and a peak-picking module 506. The pre-processing module 502 includes an algorithm to smooth and condition the signal. The differentiation module 504 includes an algorithm to accentuate sudden changes in the signal. Finally, the peak-picking module 506 includes an algorithm used to detect local maxima or peaks. The detected peaks are the visual beats.

The pre-processing module 502 involves passing the one-dimensional video feature function through an integrating or lowpass filter in order to smooth out rapid fluctuations over a short period of time (e.g., several hundred milliseconds). In an example implementation, a window with a frame length corresponding to roughly 250 ms is used, although other filter types are also suitable.

Figure 8A:
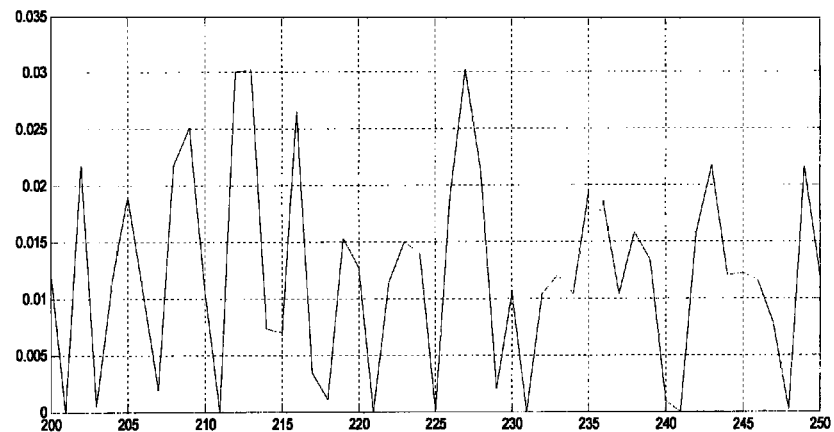
FIG. 8A is a graph illustrating an example of a one-dimensional feature function over a period of time.

FIG. 8A is a graph 800 illustrating an example of a one-dimensional video feature function 802 over a period of time prior to pre-processing. The horizontal axis corresponds to time. The vertical axis corresponds to the one-dimensional video feature value as computed by the one-dimensional video feature computation module 204.

Figure 8B:
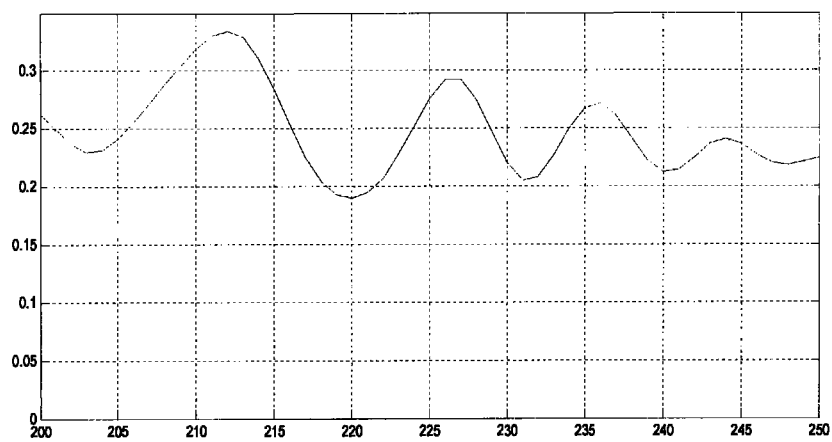
FIG. 8B is a graph illustrating an example of a smoothed one-dimensional feature function of FIG. 8A.

FIG. 8B is a graph 804 illustrating an example of a one-dimensional video feature function 806 over the period of time after pre-processing. As mentioned above, because visual beats are often perceived when motion starts, stops, or changes abruptly, the differentiation module 504 next takes the derivative of the smoothed one-dimensional video feature function 806.

Figure 8C:
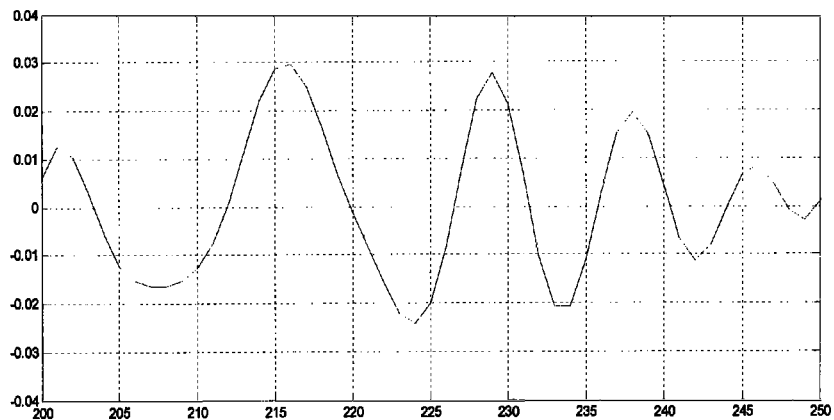
FIG. 8C is a graph illustrating an example of a derivative function of FIG. 8B.

FIG. 8C is a graph 808 illustrating an example of the one-dimensional video feature function 810 after being processed by the differentiation module 504.

Figure 8D:
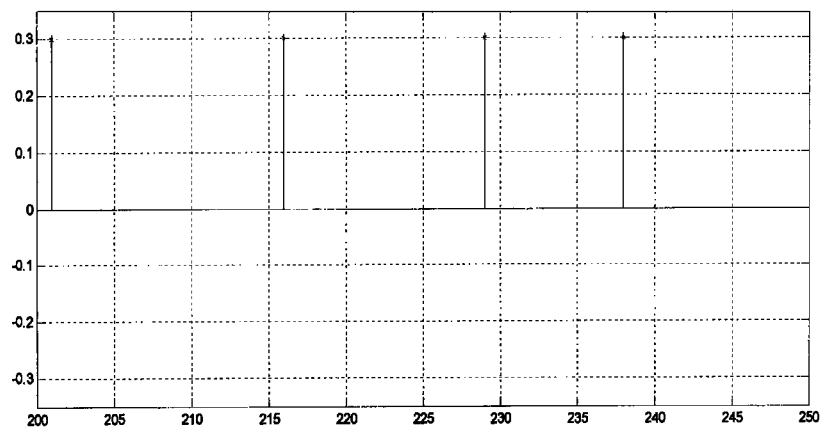
FIG. 8D is a graph illustrating an example of detected peaks and visual beats from FIG. 8C.

Finally, peak-picking techniques from peak-picking module 506 may be used to identify times with the greatest rate of change. FIG. 8D is a graph 812 illustrating an example of detected peaks 814 and visual beats.

The peak-picking technique may involve applying an adaptive threshold to the derivative signal. In an example implementation, the following adaptive threshold function may be applied, $$threshold_i = \underset{i-\frac{W}{2} \leq x < i+\frac{W}{2}}{\operatorname{argmax}} d(x) \times \beta(x) + \delta,$$

where $threshold_i$ is the adaptive threshold for a window of size W centered around element i in the derivative function $d(x)$, and $\beta(x)$ is a scaling function, and $\delta$ is an offset value.

The effect of such an adaptive threshold is to identify local maxima within a window of size W, while ignoring the effect of gradual fluctuations over longer periods of time. The value of the adaptive window size W affects the maximum rate of visual beats that can be detected. The optimal window size may therefore depend on the nature of the visual beats being detected (in terms of the range of frequencies of visual beats present in the video signal), and in one example implementation was set to correspond to approximately one second. The values of $\beta(x)$ and $\delta$ are empirically determined based on the range of values in the novelty functions to maximize the correct detection of visual beats while minimizing the false detection rate. In a simple case, $\beta(x)$ may be an empirically chosen constant $\beta(x)=b$. In another case, if more emphasis is to be put on the recent samples, $\beta(x)$ may be a monotonically increasing function.

Extending the example implementation to real-time applications, the location of the adaptive threshold window may be shifted with respect to the current time i, in order to reduce the latency of the system to perceptually acceptable levels.

In another embodiment, in addition to detecting the temporal locations of visual beat events, it may be informative to know the overall rate of the occurrences of visual beat events, or visual tempo. The visual tempo can provide a sense of the speed of rhythmic repetition of activity in the video signal. As in musical tempo, visual tempo may be represented as a count of beats per minute, or BPM. Tempo may refer to the overall beat rate in an entire video signal, or it may refer to an instantaneous beat rate within a predefined time window, which changes over the course of the video signal. The visual tempo of a segment of video may be estimated from the previously extracted information in a number of ways.

First, using the detected visual beat locations, an example embodiment computes the difference in time between successive visual beats. This time difference can also be referred to as the inter-onset interval, or IOI. Tempo is the inverse of the IOI. To measure the visual tempo of a given segment of video, the visual rhythm detector module 206 builds a histogram of the IOI's between all detected visual beats in the video segment, identifies the IOI bin with the most entries, and then takes the inverse of this IOI to get the tempo.

Because the visual beat detection algorithm may exhibit false positive or false negatives, using the IOI approach to visual tempo estimation may also be prone to errors. Therefore, a more direct approach to visual tempo estimation involves taking the autocorrelation of the intermediate derivative signal from the visual beat detection process. The lag time of the first peak beyond zero lag is taken as an estimate of the visual tempo of the video segment.

Figure 9:
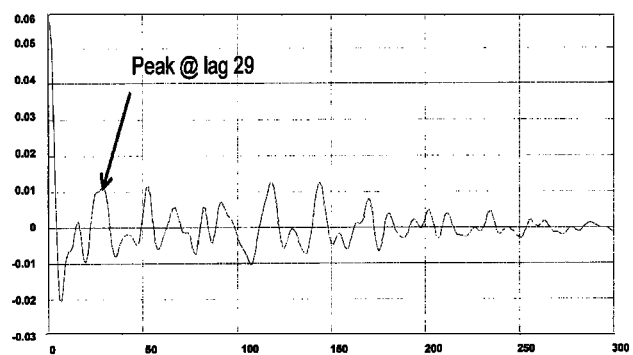
FIG. 9 is a graph illustrating an example of an autocorrelation of derivative of smothered novelty feature function.

Extending the example implementation to real-time applications, the sliding window used to compute the autocorrelation of beats may be shifted with respect to the current time, in order to reduce the latency of the system to perceptually acceptable levels. FIG. 9 is a graph 900 illustrating an example of an autocorrelation of derivative of smothered one-dimensional feature function 902. The horizontal axis corresponds to time. The vertical axis corresponds to the one-dimensional video feature value as computed by the one-dimensional video feature computation module 204.

Once visual beats have been detected and visual tempo from a video signal has been estimated, the following are example embodiments may further process this information to apply to various applications. These applications may reside in the audio/video rhythm application 106.

Automatic Retrieval of Content with Matching Rhythmic Qualities

In this example embodiment, given a video signal, one possible application is to be able to automatically select one audio signal from a collection of audio signals that has musical rhythmic qualities the most similar to the visual rhythm of the chosen video signal. A similar application may perform the opposite, with the audio signal being chosen, and a video signal being automatically selected from a collection of video signals to have matching rhythmic qualities. A simple implementation of this application may estimate the visual tempo of the video signal(s) using the algorithm described above, and compute the musical tempo of the audio signal(s) using existing audio tempo estimation algorithms. Matching content (audio and video) are then automatically ranked in closeness to each other.

A more advanced method for finding content with matching rhythms involves computing the cross-correlation distance between the visual and audio beats, and then automatically ranking potentially matching audio or video signals in order of this distance. Audio and video signals that have beat locations that are both similar distances apart from each other, and also have similar distribution patterns will have a smaller correlation distance to each other, and will be selected as the best match.

Synchronizing Audio Beats to Visual Beats

Figure 10:
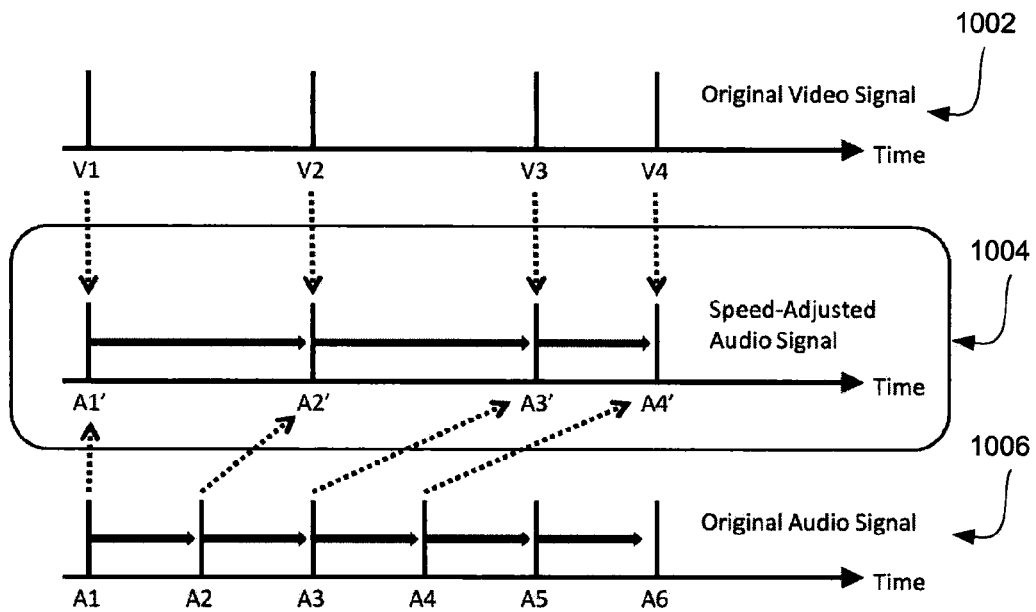
FIG. 10 is a block diagram illustrating an example adjustment of playback speed of an audio signal to match audio beats with visual beats.

FIG. 10 illustrates another example of a further processing stage. The playback speed of an audio signal 1006 may be adjusted such that the audio beat positions are aligned with visual beat positions in a video signal 1002 where Vn are times of detected visual beats, An are times of detected audio beats, and An' are the audio beat times in the speed-adjusted audio signal 1004. First, the visual beats of a video signal 1002 may be detected using the algorithm described in the example embodiments herein. Secondly, audio beats may be detected using conventional audio beat detection algorithms. Finally, the audio/video rhythm application 106 may apply audio time-stretching algorithms to the audio file 1006 to produce a speed-adjusted audio signal 1004 that has audio beats that are synchronous with the detected visual beats in the video file 1002. In order to determine the time-stretching factor, the audio/video rhythm application 106 may find the ratio between the IOI of two successive visual beats and the IOI of two successive audio beats. In the example in FIG. 10, the audio segment between times A1 and A2 is stretched by a factor of:

(V2−V1)/(A2−A1)

Audio time-shifting may be achieved through the use of conventional audio time shifting algorithms. In an example implementation, the phase vocoder technique is used, which adjusts the playback speed while maintaining the pitch/spectral profile of the audio signal. Simpler techniques that do not maintain the spectral profile of the audio quality may also be applied, although the resulting audio signal will seem to have been pitch-shifted.

In another mode of operation, the time-shifting factor is adjusted more gradually than the beat-synchronous mode of adjustment described previously. In this mode, the overall tempo rate, in BPM, of the original audio signal is estimated using conventional audio tempo estimation techniques. The instantaneous tempo rate, in BPM, of the video signal is then estimated on a continuous basis, using a sliding analysis window of a predefined duration, usually a few seconds. The instantaneous time-shifting factor may then be computed as:

$BPM_{visual}/BPM_{audio}$, where $BPM_{visual}$ is the instantaneous tempo of the video signal, and $BPM_{audio}$ is the overall tempo of the original audio signal. As the instantaneous tempo of the video signal changes, the playback speed of the audio signal will be adjusted by the calculated time-shifting factor. In a variant of this mode, the tempo of the audio signal is also estimated on a continuous basis using a sliding analysis window.

Synchronizing Visual Beats to Audio Beats

Figure 11:
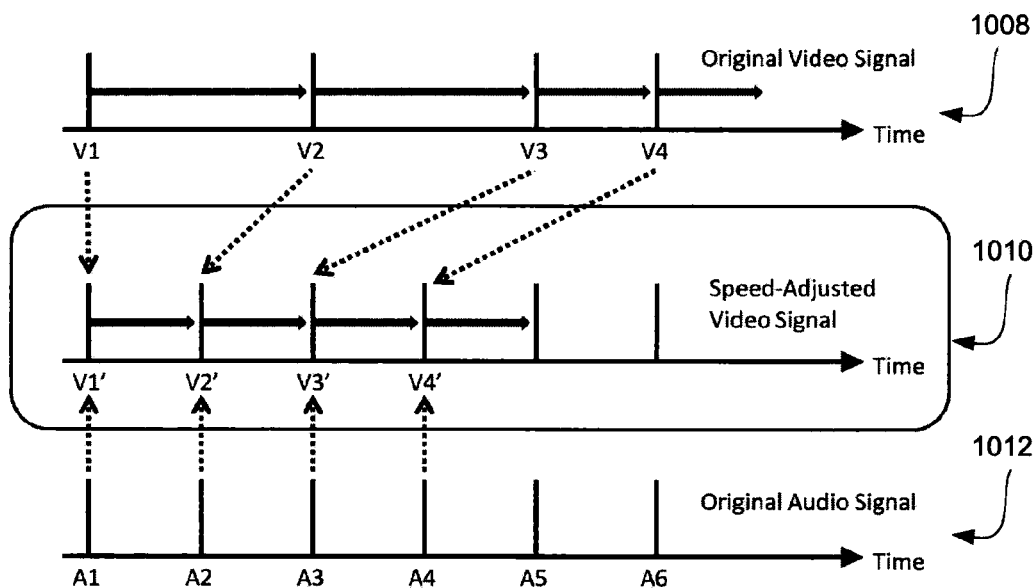
FIG. 11 is a block diagram illustrating an example adjustment of playback speed of a video signal to match visual beats with audio beats.

FIG. 11 illustrates another related application. The playback speed of a video signal 1010 may be adjusted such that the visual beat positions are aligned with audio beat positions in an audio signal 1012 where Vn are times of detected visual beats, An are times of detected audio beats, and Vn' are the visual beat positions in the speed-adjusted video signal 1010.

The video speed adjustment is achieved by adaptively varying the frame display rate such that frames corresponding to visual beats are displayed at the same time as an audio beat. Conventional frame rate adjustment methods include the simpler frame repeating (to slow down) or dropping (to speed up) techniques, and more advanced motion-estimated frame rate conversion approaches. The speed adjustment factor may be computed on a beat-by-beat basis, or on a continuous instantaneous basis, just as described in the previous process.

Figure 12:
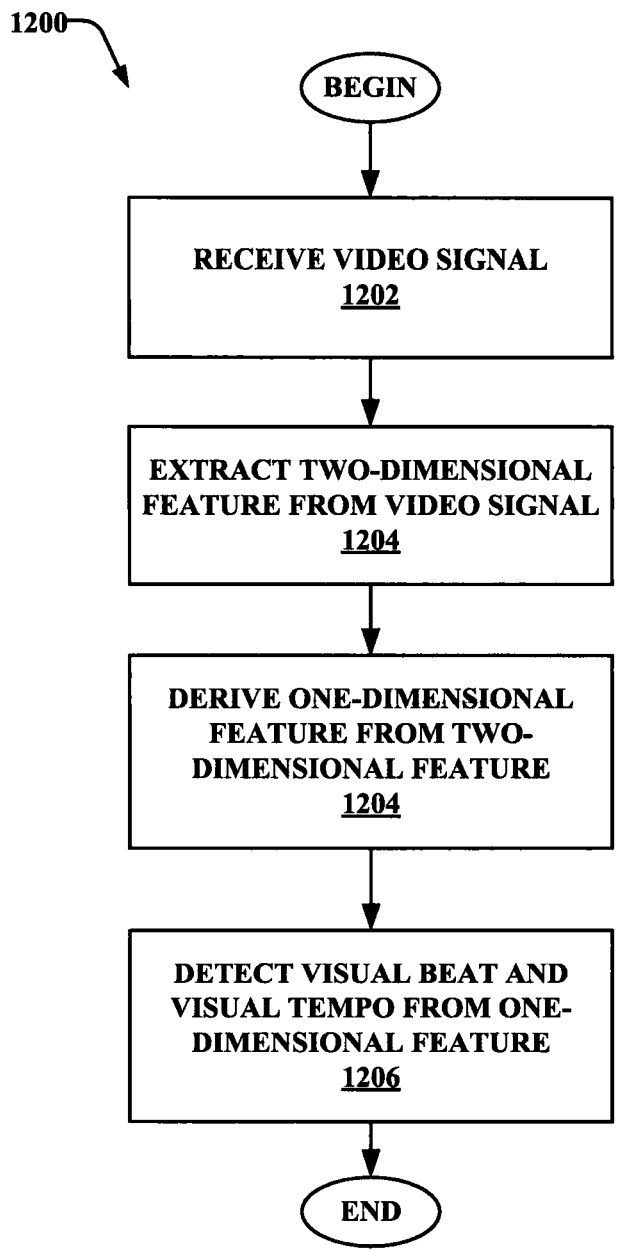
FIG. 12 is a flow chart of an example method for processing a video frame.

FIG. 12 is a flow chart of an example method for processing a video frame. At 1202, the video rhythm detection application 104 receives a video signal for processing. At 1204, the video feature extraction module 202 of the video rhythm detection application 104 extracts a two-dimensional feature from the video signal. 9. It is further envisioned that the video feature extraction module 202 of the video rhythm detection application 104 extracts an at least two-dimensional feature from at least two frames of a video signal. 9.

In one embodiment, the video feature extraction module 202 determines a two-dimensional angular coordinate of a moving pixel in successive video frames to detect pixels that have changed position between two consecutive video frames. The two-dimensional feature is computed as an optical flow vector from the two-dimensional angular coordinates of the moving pixel, where each optical flow vector includes an angle and a magnitude of the moving pixel.

In another embodiment, the video feature extraction module 202 identifies pixels that are moving with relatively higher velocities than their surrounding pixels in successive video frames to isolate moving parts from non-moving parts or slow-moving parts in a scene of the video signal. The two-dimensional feature is computed as a two-dimensional coordinate of the moving pixel, where each two-dimensional coordinate including a x-axis coordinate and a y-axis coordinate of the moving pixel.

At 1206, the one-dimensional video feature computation module 204 derives a one-dimensional feature from the extracted two-dimensional feature. In one embodiment, the one-dimensional video feature computation module 204 derives the one-dimensional feature by computing the one-dimensional feature as a first order moment of the two-dimensional feature. In another embodiment, one-dimensional video feature computation module 204 derives the one-dimensional feature by computing the one-dimensional feature as a summation of moving pixel values times its kernel. In yet another embodiment, the one-dimensional video feature computation module 204 derives the one-dimensional feature by computing an angular peakiness of each magnitude of the moving pixel, the angular peakiness representing the degree to which an aggregated motion in a video frame is coordinated.

At 1208, the visual rhythm detector module 206 detects a visual beat and a visual tempo from the one-dimensional feature.

Figure 13:
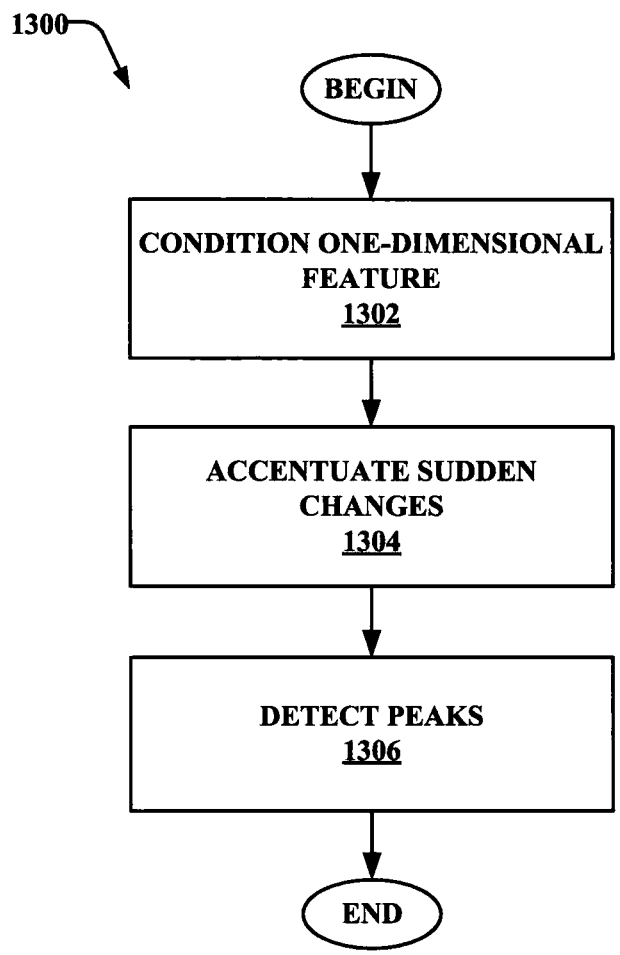
FIG. 13 is a flow chart of an example method for detecting visual beats.

FIG. 13 is a flow chart of an example method for detecting visual beats. At 1302, the visual rhythm detector module 206 conditions the one-dimensional feature to smooth out fluctuations over a period of time. At 1304, the visual rhythm detector module 206 accentuates changes in the conditioned one-dimensional feature over the period of time. At 1306, the visual rhythm detector module 206 detects at least one peak in the differential conditioned one-dimensional feature over the period of time, a peak identifying a visual beat, and the plurality of peak identifying the visual tempo over the period of time.

Figure 14:
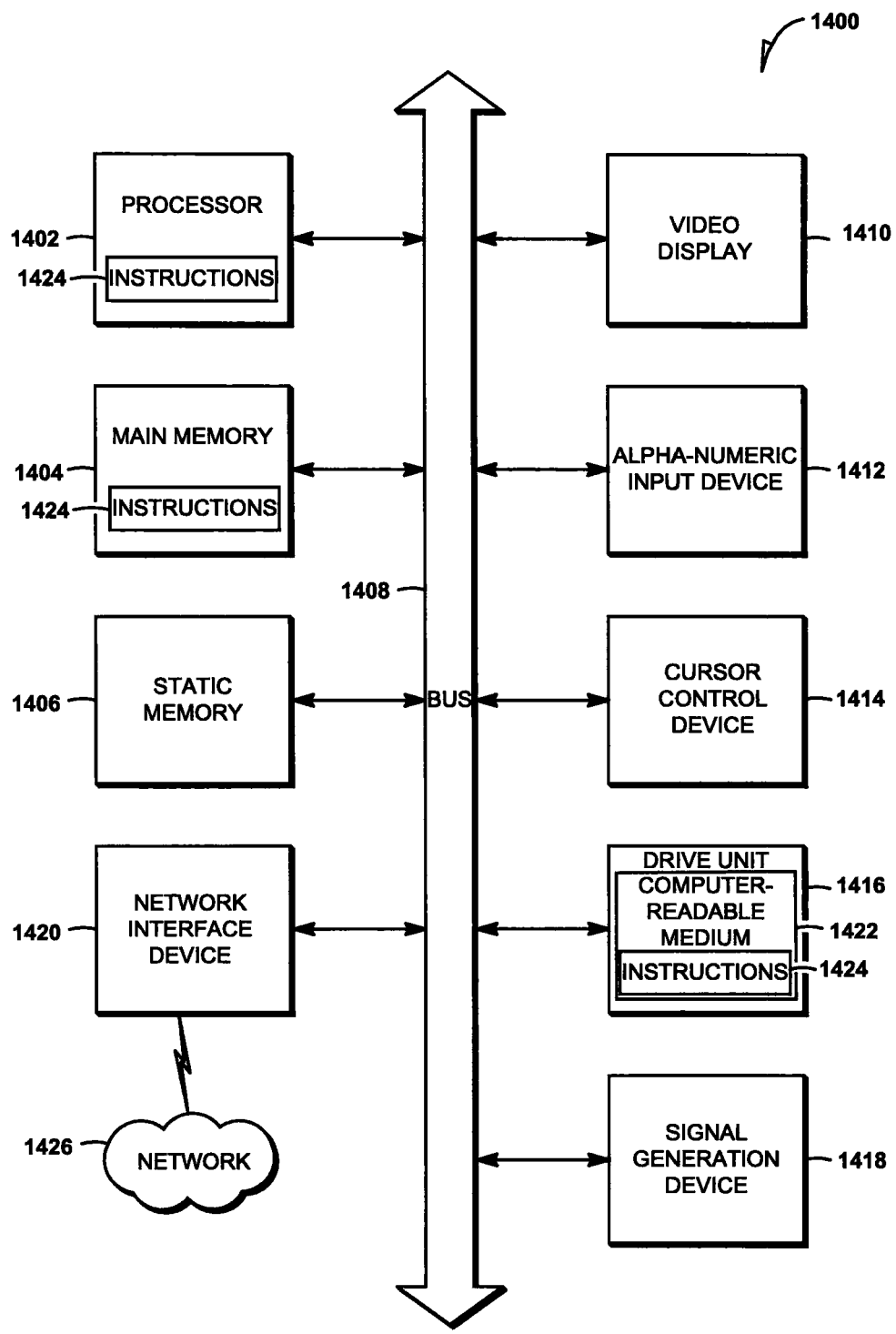
FIG. 14 shows a diagrammatic representation of machine in the example form of a computer system within which a set of instructions may be executed to cause the machine to perform any one or more of the methodologies discussed herein.

FIG. 14 shows a diagrammatic representation of machine in the example form of a computer system 1400 within which a set of instructions may be executed causing the machine to perform any one or more of the methodologies discussed herein. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1400 includes a processor 1402 (e.g., a central processing unit (CPU), a graphics processing unit (GPU) or both), a main memory 1404 and a static memory 1406, which communicate with each other via a bus 1408. The computer system 1400 may further include a video display unit 1410 (e.g., a liquid crystal display (LCD) or a cathode ray tube (CRT)). The computer system 1400 also includes an alphanumeric input device 1412 (e.g., a keyboard), a user interface (UI) navigation device 1414 (e.g., a mouse), a disk drive unit 1416, a signal generation device 1418 (e.g., a speaker) and a network interface device 1420.

The disk drive unit 1416 includes a machine-readable medium 1422 on which is stored one or more sets of instructions and data structures (e.g., software 1424) embodying or utilized by any one or more of the methodologies or functions described herein. The software 1424 may also reside, completely or at least partially, within the main memory 1404 and/or within the processor 1402 during execution thereof by the computer system 1400, the main memory 1404 and the processor 1402 also constituting machine-readable media.

The software 1424 may further be transmitted or received over a network 1426 via the network interface device 1420 utilizing any one of a number of well-known transfer protocols (e.g., HTTP).

While the machine-readable medium 1422 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present invention, or that is capable of storing, encoding or carrying data structures utilized by or associated with such a set of instructions. The term "machine-readable medium" shall accordingly be taken to include, but not be limited to, solid-state memories, optical media, and magnetic media.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A system, comprising:
 a processor;
 video feature extraction module configured by the processor to receive a video signal and to extract a two-dimensional feature from at least two video frames of the video signal;
 one-dimensional video feature computation module configured by the processor to derive a one-dimensional feature from the extracted two-dimensional feature; and
 visual rhythm detector module configured by the processor to detect visual beats and a visual tempo of the video signal from the one-dimensional feature, the visual rhythm detector module comprising:
  a pre-processing module configured by the processor to condition the one-dimensional feature to smooth fluctuations in the one-dimensional feature over a period of time;
  a different module configured by the processor to compute time derivatives of the conditioned one-dimensional feature at temporal positions within the time period; and
  a peak-picking module configured by the processor to:
   identify a plurality of local maxima in the computed derivatives, the local maxima representing corresponding ones of the visual beats and being associated with corresponding ones of the temporal positions; and
   determine a rate at which the local maxima occur within the time period, the rate representing the visual tempo.

2. The system of claim 1, wherein the video feature extraction module comprises an optical flow extraction module configured by the processor to:
 determine two-dimensional angular coordinates of a moving pixel in successive video frames of the video signal to detect a change in a pixel position of the moving pixel between two consecutive video frames of the video signal;
 compute an optical flow vector based on the two-dimensional angular coordinates, each optical flow vector including an angle and a magnitude of the moving pixel; and
 extract the two-dimensional feature based on the computed optical flow vector.

3. The system of claim 1, wherein the processor-implemented video feature extraction module comprises a foreground mask module configured by the processor to:
 determine velocities of pixel movement between successive video frames of the video signal;
 identify at least one foreground pixel and at least one background pixel based on a difference between the velocity of the foreground pixel and the velocity of the background pixel; and
 obtain the two-dimensional feature as a two-dimensional coordinate of the foreground pixel, the two-dimensional coordinate including a x-axis coordinate and a y-axis coordinate.

4. The system of claim 1, wherein the one-dimensional feature computation module comprises:
 a moment computation module configured by the processor to compute the one-dimensional feature as a first order moment of the two-dimensional feature.

5. The system of claim 1, wherein the one-dimensional feature computation module comprises:
 a center-of-gravity computation module configured by the processor to compute the one-dimensional feature as a sum of corresponding products of the moving pixel values and corresponding kernels.

6. The system of claim 2, wherein one-dimensional feature computation module comprises:
a module configured by the processor to compute a value indicative of an angular peakiness of each magnitude of the moving pixel, the angular peakiness representing the degree to which an aggregated motion in a video frame is coordinated.

7. A computer-implemented method, comprising:
receiving a video signal;
extracting a two-dimensional feature from the video signal;
deriving a one-dimensional feature from the extracted two-dimensional feature; and
detecting visual beats and a visual tempo of the received video signal from the one-dimensional feature, the detecting comprising:
conditioning the one-dimensional feature to smooth fluctuations in the one-dimensional feature over a period of time;
computing time derivatives of the conditioned one-dimensional feature at temporal positions within the time period;
identifying a plurality of local maxima in the computed derivatives, the local maxima representing corresponding ones of the visual beats and being associated with corresponding ones of the temporal positions; and
determining a rate at which the local maxima occur within the time period, the rate representing the visual tempo.

8. The computer-implemented method of claim 7, wherein extracting the two-dimensional feature comprises:
determining two-dimensional angular coordinates of a moving pixel in successive video frames of the video signal to detect a change in a pixel position of the moving pixel between two consecutive video frames of the video signal;
computing an optical flow vector based on the two-dimensional angular coordinates, each optical flow vector including an angle and a magnitude of the moving pixel; and
extracting the two-dimensional feature based on the computed optical flow vector.

9. The computer-implemented method of claim 7, wherein extracting the two-dimensional feature comprises:
determining velocities of pixel movement between successive video frames of the video signal;
identifying at least one foreground pixel and at least one background pixel based on a difference between the velocity of the foreground pixel and the velocity of the background pixel; and
obtaining the two-dimensional feature as a two-dimensional coordinate of the foreground pixel, the two-dimensional coordinate including a x-axis coordinate and a y-axis coordinate.

10. The computer-implemented method of claim 7, wherein deriving the one-dimensional feature comprises:
computing the one-dimensional feature as a first order moment of the two-dimensional feature.

11. The computer-implemented method of claim 7, wherein deriving the one-dimensional feature comprises:
computing the one-dimensional feature as a sum of corresponding products of moving pixel values and corresponding kernels.

12. The computer-implemented method of claim 8, wherein deriving the one-dimensional feature comprises:
computing a value indicative of an angular peakiness of each magnitude of the moving pixel, the angular peakiness representing the degree to which an aggregated motion in a video frame is coordinated.

13. A non-transitory computer-readable storage medium storing instructions that, when executed by at least one processor, cause the at least one processor to perform a method, comprising:
receiving a video signal;
extracting a two-dimensional feature from the video signal;
deriving a one-dimensional feature from the extracted two-dimensional feature; and
detecting visual beats and a visual tempo of the received video signal from the one-dimensional feature, the detecting comprising:
conditioning the one-dimensional feature to smooth fluctuations in the one-dimensional feature over a period of time;
computing time derivatives of the conditioned one-dimensional feature at temporal positions within the time period;
identifying a plurality of local maxima in the computed derivatives, the local maxima representing corresponding ones of the visual beats and being associated with corresponding ones of the temporal positions; and
determining a rate at which the local maximum occur within the time period, the rate representing the visual tempo.

14. The non-transitory computer-readable storage medium of claim 13, wherein extracting the two-dimensional feature comprises:
determining two-dimensional angular coordinates of a moving pixel in successive video frames of the video signal to detect a change in a pixel position of the moving pixel between two consecutive video frames of the video signal;
computing an optical flow vector based on the two-dimensional angular coordinate, each optical flow vector including an angle and a magnitude of the moving pixel; and
extracting the two-dimensional feature based on the computed optical flow vector.

15. The non-transitory computer-readable storage medium of claim 13, wherein extracting the two-dimensional feature comprises:
determining velocities of pixel movement between successive video frames of the video signal;
identifying at least one foreground pixel and at least one background pixel based on a difference between the velocity of the foreground pixel and the velocity of the background pixel; and
obtaining the two-dimensional feature as a two-dimensional coordinate of the foreground pixel, the two-dimensional coordinate including a x-axis coordinate and a y-axis coordinate.

16. The non-transitory computer-readable storage medium of claim 13, wherein deriving the one-dimensional feature comprises:
computing the one-dimensional feature as a first order moment of the two-dimensional feature.

17. The non-transitory computer-readable storage medium of claim 13, wherein deriving the one-dimensional feature comprises:

computing the one-dimensional feature as a sum of corresponding products of moving pixel values and corresponding kernels.

18. The non-transitory computer-readable storage medium of claim 14, wherein deriving the one-dimensional feature comprises:

computing an angular peakiness of each magnitude of the moving pixel, the angular peakiness representing the degree to which an aggregated motion in a video frame is coordinated.

19. The system of claim 1, wherein the peak-picking module is further configured by the processor to identify the local maxima within corresponding temporal windows, the temporal windows comprising sets of continuous temporal positions within the time period.

20. The system of claim 19, wherein the peak-picking module is further configured by the processor to determine a size of at least one of the temporal windows based on the determined rate.

21. The system of claim 1, wherein the peak-picking module is further configured by the processor to:

calculate scaled derivative values based on an application of a scaling function to the computed derivatives, the scaling function monotonically increasing with increasing time; and identify the local maxima in the scaled derivative values.

22. The system of claim 3, wherein the foreground mask module is further configured by the processor to:

establish a first pixel as the background pixel when the corresponding velocity falls below a first threshold value; and establish a second pixel as the foreground pixel when a difference between the velocity of the second pixel and the velocity of the background pixel exceeds a second threshold value.

23. The system of claim 3, wherein the foreground mask module is further configured by the processor to identify the background pixel based on information associated with a background pixel model.

* * * * *